June 16, 1942.    J. D. MINTON ET AL    2,286,430
COMPARISON MICROSCOPE
Filed Feb. 27, 1939    2 Sheets-Sheet 1
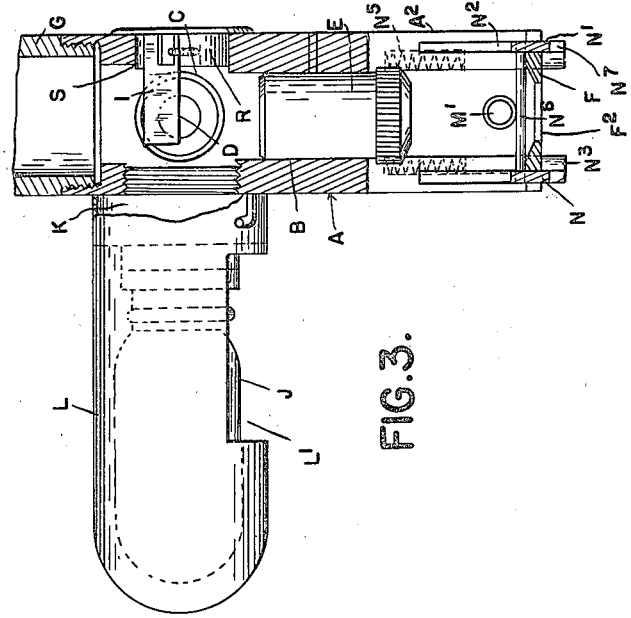
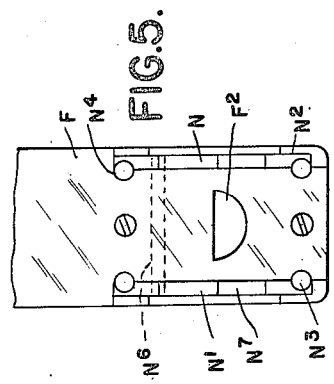
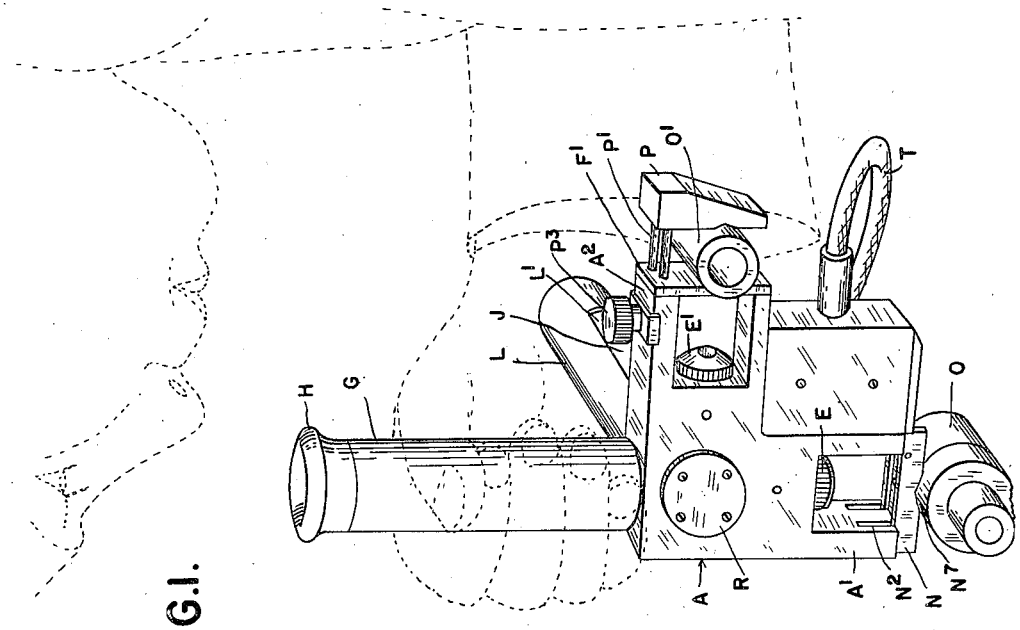
INVENTORS
JOHN D. MINTON
WILLIAM F. KLEMM
BY Whittemore Hulbert & Belknap
ATTORNEYS June 16, 1942.   J. D. MINTON ET AL   2,286,430
COMPARISON MICROSCOPE
Filed Feb. 27, 1939   2 Sheets-Sheet 2
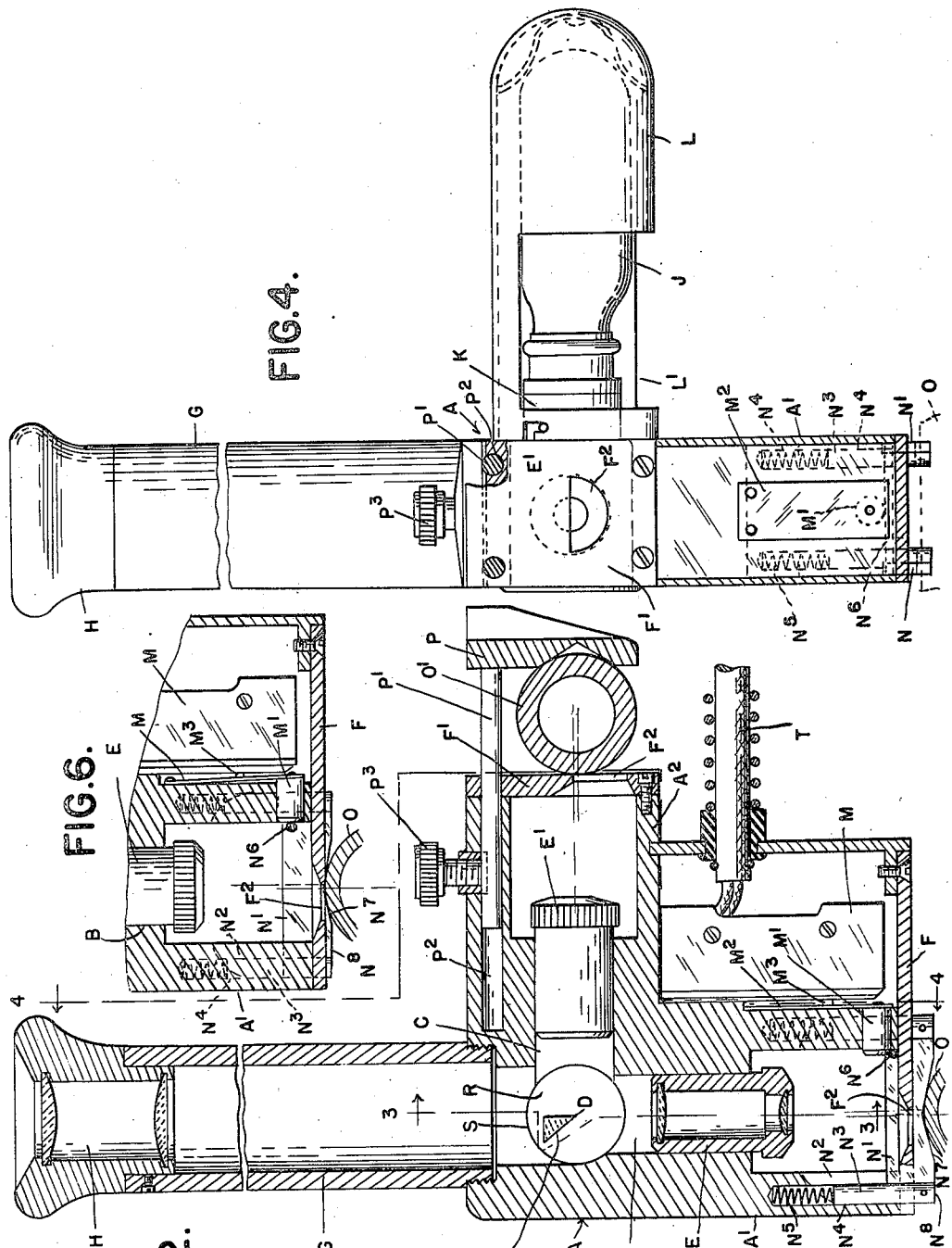
INVENTORS
JOHN D. MINTON
WILLIAM F. KLEMM
BY
ATTORNEYS Patented June 16, 1942

2,286,430

UNITED STATES PATENT OFFICE 2,286,430

COMPARISON MICROSCOPE

John D. Minton and William F. Klemm, Detroit, Mich.; said Minton assignor to said Klemm Application February 27, 1939, Serial No. 258,802

15 Claims. (Cl. 88—39)

The invention relates to instruments designed for use in the simultaneous microscopic examination and comparison of surfaces, or what is generally known as a comparison microscope. It is the primary object of the invention to obtain a construction which can be conveniently used for the comparison of various articles of manufacture with a standard article to determine whether they are of the same quality. For this purpose it is desirable that the instrument should be portable and also of such shape that it may be applied to surfaces more or less obstructed by other parts. A further object is to obtain a construction in which the surfaces compared are arranged in the field of vision on opposite sides of a line passing through the center of vision. It is also an object to avoid any overlapping of these surfaces in the field of vision and to insure that the two portions are in equally sharp focus. With these and other objects in view, the invention consists in the construction as hereinafter set forth.

In the drawings:

Figure 1 is a perspective view of the instrument as in use;

Figure 2 is a vertical central section therethrough;

Figure 3 is a cross section on line 3—3 of Figure 2;

Figure 4 is a sectional elevation on line 4—4 of Figure 2;

Figure 5 is a bottom plan view of the positioning means;

Figure 6 is a section similar to Figure 2 showing the work in focus position and the switch operated for lighting the lamp.

As illustrated, A is a substantially rectangular casing having extending therethrough a cylindrical bore B and also a bore C at a divergent angle. The axes of these two bores intersect at a point D and are preferably arranged at right angles to each other. E and E' are objective lens assemblies, the barrels of which fit within the bores B and C. F and F' are apertured focusing plates mounted on bifurcated extensions A' and A² of the casing A and suitably spaced from the objectives E and E'. G is a tube axially aligned with the bore B carrying at its outer end the eyepiece H. I is a reflector having one edge located in the point of intersection of the axes of the bores B and C and with its reflecting surface arranged in a plane at an angle of 45° to said axes. With the arrangement as thus far described the field of vision through the eyepiece H is divided by the reflector I into two portions on opposite sides of the center of vision; one portion receving light through the objective E and the other portion through the objective E'. This permits of arranging the article having the standard surface adjacent to the focusing plate F' at one side of the casing A, while the object to be compared therewith can be placed beneath the focusing plate F in the direct line of vision.

To obtain a correct comparison between the two surfaces examined, it is essential that they should be similarly and equally illuminated. With certain instruments heretofore constructed separate lamps are used for the two surfaces, but with such construction there is always danger that one lamp may not be quite equal in power to the other, or that the lighting effect may be in some respect varied on the two surfaces. To avoid such difficulty we employ a single lamp for illuminating both surfaces. This lamp is also located to be at an equal distance from each surface and so that the light rays will be at corresponding angles to said surfaces. As shown, an electric lamp J is secured in a socket K, the axis of which is in the line of intersection of the axes of the bores B and C and perpendicular thereto. The lamp is enclosed by a reflector hood L having a window opening L' through which the light can pass between the furcations A' and A² to the apertured focusing plates F and F'. The articles to be compared are arranged adjacent to these plates so that a portion of the surface of each will be visible through the aperture and will be similarily and equally illuminated.

For convenience in operation, we provide a controlling switch for the lamp J, together with means for automatically closing this switch whenever the instrument is placed in operative relation with the surface to be examined. The switch M may be of any suitable construction, not shown in detail, and is preferably located in the angle of the housing A between the extensions A' and A² thereof. This switch is operated whenever the instrument is placed against the surface to be examined by the following construction. N and N' are members extending across between the furcations of the extension A' on opposite sides thereof and slidably engaging slots $N^2$ in said furcations. $N^3$ are guide posts secured to the members N and N' and engaging bores $N^4$ which intersect the slots $N^2$. $N^5$ are springs in the bores bearing against the ends of the posts and serving to yieldably press the same outward. $N^6$ is a cross pin between the members N and N' inside of the focus plate F and which normally contacts therewith to limit the outward movement of the posts N³ and members N and N'. These members N and N' are provided with V-shaped notches N⁷ therein, which are adapted to engage a cylindrical member, such as O, the surface of which is to be examined, and to hold said member with its axis in a fixed location with respect to the center of vision. However, in the normal position of the members N and N', the member O will be held out of contact with the focus plate F, but by pressing the instrument downward the springs N⁵ will yield until the cylindrical surface contacts with said focus plate. Such movement causes the cross pin N⁶ to laterally displace a button M' attached to a spring M² which latter contacts with a pin M³ for operating the switch M. Thus whenever the instrument is pressed down against the surface to be examined to bring said surface into the focus plane, this will simultaneously operate the switch M and illuminate the lamp J. The light from this lamp will simultaneously illuminate the surface of the article O which is being examined and also the surface of a standard article O' which is placed adjacent to the focus plate F'. This article O' is positioned by a notched holder plate P which has rods P' slidably engaging bores P² and secured by a clamping screw P³.

The apertures F² in the focus plates F and F' are semi-circular with the straight side lying in the center of vision so that the article observed occupies only one-half the field of vision and the imperforate portion of the plate shields the other half. This prevents any overlapping of the surfaces observed in the two portions of the field and forms a sharp line of division between said portions. Where the article observed is cylindrical, the V-shaped notches N⁷ in the members N and N' serve to center said article so that it contacts with the plate F' in a line slightly offset from the center of vision. This point of contact will be sharply in focus, while the portions of the surface on opposite sides thereof will gradually curve out of the focus plane. The curvature is not, however, enough to materially affect the sharpness of focus, particularly where the point of tangency is offset from the center of vision, so that the falling away is on opposite sides thereof. This is illustrated in Figures 2 and 6. The line of contact of the standard cylindrical article O' is similarly offset with respect to the center of vision. Where the surface to be observed is flat this will contact with the portions N⁸ on opposite sides of the V-shaped notches N⁷, there being sufficient movement permitted the members N and N' to bring such surface in contact with the focus plate F.

The reflector I is preferably formed of a transparent prism having its reflecting surface constituting the hypotenuse of a right angle triangle, which is at an angle of 45° to the axes of the objectives E and E'. This prism must be very accurately located both for the purpose of having its reflective surface at the right angle and also having one edge of this surface in a line perpendicular to and at the point of intersection of said axes. This we accomplish by mounting the prism on a cap R engaging a circular aperture in the wall of the casing A, the center of which is in line with the point of intersection of the axes of the objectives. This permits of very accurate adjustment of the reflecting surface by a slight rotation of the cap and after once properly positioned the cap is locked in this position by securing screws. The cap R is also diametrically opposite the socket K which is located in an aperture S in the wall of the casing.

With the construction as described the instrument may be conveniently handled by grasping the barrel or tube G, as indicated in Figure 1, and thereby bringing it into proper relation with the article to be examined. As soon as it is pressed down against this article the plate F is moved into focus position and simultaneously the switch M is closed to light the lamp. The electric current is conveyed to the switch through a suitable flexible conductor which passes into the casing through a guarding conduit T. Where a series of articles of the same character are successively examined and compared with the standard article, it is unnecessary to adjust the focus. However, where there is a change in the character of the surface as for instance changing from convex to concave, this may require refocusing. We have, therefore, provided for axial adjustment of the objectives E and E' in the bores B and C, and set screws B' and C' serve to hold these members in adjusted position.

What we claim as our invention is:

1. A comparison microscope comprising a frame having mounted thereon two objectives with their axes perpendicular to each other and intersecting, an eyepiece in alignment with the axis of one of said objectives, a reflector having one edge at the point of intersection of and perpendicular to said axes with its reflecting surface bisecting the angle between said axes, said reflector intercepting one-half of the field of vision through the objective in alignment with the eyepiece and reflecting into said eyepiece one-half of the field of vision through the other objective, means for bringing the objects to be compared into operative relation to the respective objectives, and a single light source projecting from said frame on a line perpendicular to said axes at the point of intersection thereof, whereby the light from said source will extend at equal oblique angles to the respective objects to illuminate the surfaces thereof with equal intensity.

2. A comparison microscope comprising a frame having mounted thereon two objectives with their axes perpendicular to each other and intersecting an eyepiece in alignment with the axis of one of said objectives, a reflector having one edge at the point of intersection and perpendicular to said axes with its reflecting surface bisecting the angle between said axes, said reflector intercepting one-half of the field of vision through the objective in alignment with the eyepiece and reflecting into said eyepiece one-half of the field of vision through the other objective, means for mounting a master object in operative relation to the laterally extending objective, means on said frame for positioning the other objective in operative relation to the object to be compared, said latter means being movable toward or from a position of focus, a single light source mounted on said frame and substantially equally spaced from and at equal oblique angles to the observed surfaces of said objects to illuminate the same with equal intensity, and means on said frame for automatically turning on and off said light on the movement of said movable means respectively toward or from the position of focus.

3. In a comparison microscope, an optical system including an objective, a mask disposed in front of and in fixed relation to said objective and providing an external surface located in the focal plane thereof, said mask having an aperture of which one edge is a straight line bisecting the field viewed by said objective, and means for locating a cylindrical object against said surface with predetermined relation to said aperture, said means comprising a device for receiving said object in a predetermined angular position with respect to the edge of said aperture, and means for supporting said device with respect to said mask so as to permit a limited relative movement sufficient to bring the object against said surface.

4. In a comparison microscope, an optical system including an objective, a mask disposed in front of and in fixed relation to said objective and provided with an aperture in the focal plane thereof, one edge of said aperture being a straight line bisecting the field viewed by said objective, a positioning device including a V-shaped bearing for aligning the axes of cylinders of different diameters parallel to the edge of said aperture, and means for supporting said device with respect to said mask so as to permit sufficient relative movement of the parts to bring a cylinder aligned in said bearing into the focal plane with a predetermined portion of the cylinder exposed to the objective through said aperture.

5. In a comparison microscope, an optical system including an objective, a mask disposed in front of said objective and having an aperture in the focal plane thereof, one edge of said aperture being a straight line bisecting the field viewed by said objective, a frame on which said optical system and mask are supported, a positioning device supported on said frame and movable relative thereto to bring a cylindrical object against said aperture, and locating means included in said device for aligning the axis of the object parallel to the edge of said aperture.

6. In a comparison microscope, an optical system including an objective, a mask disposed in front of said objective and having an aperture in the focal plane thereof, one edge of said aperture being a straight line bisecting the field viewed by said objective, a frame on which said optical system and mask are supported, a positioning device having V-shaped bearings adapted to be pressed against a cylindrical surface, means supporting said device on said frame to permit relative movement between said mask and bearings to bring a portion of said surface in front of said aperture, and resilient means opposing such relative movement.

7. In a comparison microscope, an optical system including an objective, a frame for supporting the parts of said optical system, said frame including slotted members extending forward approximately to the focal plane of said objective, a mask secured to the ends of said members and adapted to stop a predetermined portion of the field viewed by said objective, a locating device movable in the slots in said members for bringing an object into said field, and resilient means opposing such movement.

8. In a comparison microscope, an optical system including an objective, a frame for supporting the parts of said optical system, said frame including members extending forward approximately to the focal plane of said objective, a transverse plate secured to the ends of said members, said plate having an aperture coextensive with a predetermined portion of the field of said objective, a locating device having V-shaped bearings for receiving a cylindrical object, and means supporting said device on said members and providing for a limited movement of said bearings toward said plate in a direction parallel to the axis of said objective.

9. In a comparison microscope, an optical system including two objectives arranged with their axes intersecting each other, an eyepiece in alignment with a first one of said objectives, and a reflector located between the eyepiece and the first objective and arranged to intercept one-half the field of vision therethrough and to direct into said eyepiece a complementary half of the field of vision through the second objective, a frame for supporting said parts, a mask supported on said frame in front of the first objective and having an aperture which is coextensive with the unobstructed half of the field of vision through said first objective, and a mask supported on said frame in front of the second objective and having an aperture which is coextensive with the reflected half of the field of vision through said second objective.

10. In a comparison microscope, an optical system including two objectives arranged with their axes intersecting each other, an eyepiece in alignment with a first one of said objectives, and a reflector located between the eyepiece and the first objective and arranged to intercept one-half the field of vision therethrough and to direct into said eyepiece a complementary half of the field of vision through the second objective, a frame for supporting said parts, two masks supported on said frame in front of said objectives, respectively, and having apertures which are coextensive with the respective halves of the fields of vision therethrough which are transmitted to said eyepiece, means supported on said frame for locating a master object and a test object in front of said apertures, respectively, and a common light source supported on said frame at equal optical distances from said objects to illuminate the same through said apertures over light paths equal in length.

11. In a comparison microscope, a frame, two objectives supported on said frame with their axes intersecting each other, two masks supported on said frame in front of said objectives, respectively, said masks having semi-circular apertures therein so oriented that their straight edges are parallel to each other and perpendicular to the axes of said objectives, an eyepiece, and means including said objectives for causing said apertures to appear side by side in the field of vision of said eyepiece with their straight edges together.

12. In a comparison microscope, a frame, two objectives supported on said frame with their axes intersecting each other, two masks supported on said frame in front of said objectives, respectively, said masks having semi-circular apertures therein so oriented that their straight edges are parallel to each other and perpendicular to the axes of said objectives, means on said frame for locating two cylindrical objects adjacent said apertures, respectively, with their axes parallel to the edges thereof, a common light source for directly illuminating corresponding areas of said objects through said apertures, an eyepiece, and means including said objectives for enabling said areas to be viewed side by side through said eyepiece.

13. In a comparison microscope, a frame, two objectives supported on said frame with their axes intersecting each other, two masks supported on said frame in front of said objectives, respectively, said masks having semi-circular apertures therein so oriented that their straight edges are parallel to each other and perpendicular to the axes of said objectives, means on said frame for locating a master object and a test object adjacent said apertures, respectively, and a light source supported on said frame at a point to one side of the plane of said objectives and equidistant therefrom, the said frame having recesses between the objectives and the associated masks to enable light from said source to reach said objects through said apertures.

14. In a comparison microscope, a frame comprising integrally formed parts extending at right angles to each other, said parts having axial cylindrical bores intersecting inside the frame, objectives mounted in said bores, respectively, there being a transverse cylindrical opening extending through the frame and so located that its axis is perpendicular to the axes of said bores and passes through the intersection thereof, a reflector inside said frame, a reflector mounting device positioned in said opening at one side of the frame, and a support for a lamp positioned in said opening at the opposite side of said frame.

15. In a comparison microscope as set forth in claim 5, a source of light supported on the frame to illuminate the object through the aperture, and a switch for the light source operated by movement of the positioning device relative to the frame.

JOHN D. MINTON.
WILLIAM F. KLEMM.